(12) United States Patent
Nomoto

(10) Patent No.: US 7,916,179 B2
(45) Date of Patent: Mar. 29, 2011

(54) DIGITAL CAMERA

(75) Inventor: Tetsushi Nomoto, Yokohama (JP)

(73) Assignee: Nikon Corporation, Tokyo (JP)

( * ) Notice: Subject to any disclaimer, the term of this patent is extended or adjusted under 35 U.S.C. 154(b) by 681 days.

(21) Appl. No.: 11/885,183

(22) PCT Filed: Mar. 17, 2006

(86) PCT No.: PCT/JP2006/305366
§ 371 (c)(1),
(2), (4) Date: Aug. 28, 2007

(87) PCT Pub. No.: WO2006/101035
PCT Pub. Date: Sep. 28, 2006

(65) Prior Publication Data
US 2008/0316319 A1    Dec. 25, 2008

(30) Foreign Application Priority Data

Mar. 18, 2005  (JP) ................................ 2005-079212
Mar. 18, 2005  (JP) ................................ 2005-079213
Mar. 18, 2005  (JP) ................................ 2005-079214
Dec. 15, 2005  (JP) ................................ 2005-361192

(51) Int. Cl.
*H04N 5/232* (2006.01)
(52) U.S. Cl. .................................................. 348/211.4
(58) Field of Classification Search ............ 348/207.99, 348/360, 211.99–211.2, 211.4
See application file for complete search history.

(56) References Cited

U.S. PATENT DOCUMENTS

| 6,628,899 | B1 | 9/2003 | Kito |
| 2001/0055373 | A1 | 12/2001 | Yamashita |
| 2004/0135905 | A1 | 7/2004 | Suda |
| 2004/0196006 | A1 | 10/2004 | Kawaguchi et al. |
| 2004/0249861 | A1 | 12/2004 | Hoshino et al. |
| 2005/0134707 | A1 | 6/2005 | Perotti et al. |
| 2005/0140816 | A1* | 6/2005 | Tschida et al. ................ 348/360 |
| 2006/0023070 | A1 | 2/2006 | Nakamura et al. |
| 2006/0050170 | A1* | 3/2006 | Tanaka ........................... 348/360 |

FOREIGN PATENT DOCUMENTS

| JP | A-2001-134724 | 5/2001 |
| JP | A-2001-358978 | 12/2001 |
| JP | A 2002-343449 | 11/2002 |
| JP | A 2004-213372 | 7/2004 |
| JP | A 2004-215088 | 7/2004 |
| JP | A 2004-311136 | 11/2004 |
| JP | A 2004-328202 | 11/2004 |
| JP | A-2005-006214 | 1/2005 |
| JP | A 2005-094363 | 4/2005 |
| JP | A 2005-345802 | 12/2005 |

(Continued)

OTHER PUBLICATIONS

Jan. 5, 2010 Office Action issued in Japanese Patent Application No. 2005-079214.

(Continued)

*Primary Examiner* — Tuan Ho
(74) *Attorney, Agent, or Firm* — Oliff & Berridge, PLC

(57) ABSTRACT

A digital camera procures from an external device related to image-capturing upon image-capturing data on the external device and records the procured data and digital image data of the procured image in relation to each other.

23 Claims, 11 Drawing Sheets

FOREIGN PATENT DOCUMENTS

| | | |
|---|---|---|
| JP | A 2006-098518 | 4/2006 |
| WO | WO 03/060607 A1 | 7/2003 |

OTHER PUBLICATIONS

Jan. 5, 2010 Office Action issued in Japanese Patent Application No. 2005-079213.

Jan. 5, 2010 Office Action issued in Japanese Patent Application No. 2005-079212.

Office Action in European Application No. 06 729 356.3, mailed Dec. 20, 2010.

\* cited by examiner

FIG. 7

| PARAMETER | LANGUAGE |
|---|---|
| 1 | JAPANESE |
| 2 | ENGLISH |
| 3 | GERMAN |
| 4 | FRENCH |
| 5 | ITALIAN |
| 6 | CHINESE |
| 7 | KOREAN |
| 8 | ARABIC |
| 9 | SPANISH |
| 10 | PORTUGUEESE |
| : | : |

DIGITAL CAMERA

TECHNICAL FIELD

The present invention relates to a digital camera having a storing unit capable of contactless reading/writing.

BACKGROUND ART

A digital camera is provided with a number of different accessories and appropriate accessories are attached to or detached from the digital camera depending on photographing conditions and photographing intentions before photographing can be performed. Known accessories include those electrically connected to a digital camera main body whose operation is under control by signals from the digital camera main body or transmit information on the accessories stored in a storing unit to the digital camera main body. Accessories having a function of transmitting information on the accessories to the digital camera main body include, for example, an image-capturing lens having an AF (autofocusing) function and a strobe unit whereas those accessories having no such a function include, for example, various filters or hoods, close-up lenses to be attached to the front end of the image-capturing lens, conversion lenses to be attached between an exchange lens and the digital camera main body, a close-up ring, a shutter release cable, and a tripod.

When images are published, it is often the case that information on the accessories used upon the capturing the images are attached to the images. In the case of the former group of accessories, the digital camera automatically captures information on the accessory from the accessory as necessary, and attaches the information to the image data of the captured image before the image data can be recorded. Also, conditions of the accessories upon image-capturing are automatically incorporated into the digital camera. For example, for a photographic lens, information such as name of manufacturer, focal length, and open aperture number, and in addition actual aperture upon image-capturing are transmitted to the digital camera.

In the case of the latter group of accessories, the information on the accessory is added to the image data of the image captured using the accessory by manual inputting operation. Addition of the information is performed by using the digital camera having captured the subject image or a personal computer having read therein the image data of a subject image.

It has been known from the following Patent Document 1 to obtain subject identifying information being had by the subject and implement processing on the captured image in correspondence to the characteristics of the subject.

Patent Document 1: Japanese Patent Application Laid-open No. 2004-328202

Patent Document 1 discloses an image processing system having a contactless readable memory storing identification information for an item; a photographing device having a reading device that reads out stored data from the memory; a database that stores the information on the item and the identification information in relation to each other; and an image processing device that performs image processing. In the conventional image processing system, the photographing device reads out the identification information and provides the read identification information in relation to the captured image to the image processing device.

The image processing device reads out corresponding item information from the database based on the identification information and performs image processing of the image data, so that upon reproduction of the image data, each item in the image can be reproduced in an appropriate color close to actual color independently of a light source used upon the image-capturing.

DISCLOSURE OF THE INVENTION

Problem to be Solved by the Invention

In the case of latter accessories, that is, those accessories that whose operation is neither controlled by signals from the digital camera main body nor that transmit information on the accessories themselves to the digital camera main body, manual operation of inputting information on the accessories is required in order to add information on the accessories to the image data. This is cumbersome. It is possible to input each piece of information on the accessory used for each image in a lump later in order to avoid the risk of missing a chance for photographing. However, when a number of images have been captured while attaching/detaching a number of different accessories to/from the camera, it is difficult to correctly memorize or make note as to which accessory has been used for capturing each image.

In addition, some of the functions of a digital camera may differ depending on destinations to which the digital cameras are shipped. For instance, the language used in display on a display unit may be different from destination to destination. To change a part of functions depending on the destination, a plurality of types of operation programs for causing the controlling unit to execute a part of the functions of the digital camera under different implementation conditions and a data list containing a plurality of implementation conditions to be referred to for selecting one therefrom are stored in a storing unit, and any one of the operation programs selected by a predetermined method and one implementation condition selected from the data list depending on the destination or the like is used.

The operation program and data list to be used are determined, for example, depending on the values of parameters described in the program. If a part of the functions can be changed by the user, the values of the parameters are set to default values depending on the destination during manufacture of the digital camera by the manufacturer. Also, there are known those cameras that have values of parameters read-in into the storage medium attached to the camera and read-out the values of the parameters from the storage medium upon use. In addition, there is known IC cards and IC tags that have an antenna unit and a storing unit and are capable of receiving power supply from outside wirelessly with the data in the storing unit being readable or writable based on signals from outside in a contact-less manner.

Digital camera manufacturers install programs having different values of parameters into the storing units in the digital cameras so that the type of language used for display on a display unit can correspond to the type of the language of the destination of shipment. Therefore, if the ship-to address of shipment is changed after the program has been installed, a program having different values of parameters must be installed again, thus taking a bit more effort. If the ship-to address of shipment is changed after packing for shipment has been completed, unpacking operation to open the package and re-packing operation become necessary. Although change of parameters can be made by adding a predetermined operation to the digital camera, this also takes much trouble. Such a problem is encountered not only in digital cameras but also in electronic devices in general in which firmware programs are installed.

In addition, there is known a system that receives services including printing photographs based on image data acquired by digital cameras. To receive this service, a user delivers information on an applicant for the service along with image data to the service provider. For instance, the user delivers to the service provider a recording medium that records image data and an application form for the service on which the information on the applicant for the service is recorded. Also, image data and digitized application form for the service are transmitted via e-mail or a recording medium having recorded therein the information on the applicant for the service is delivered to the service provider.

In the system described above, the application form for the service must be prepared for each application for service, which is troublesome. Also, in the case where the information on the applicant for the service is recorded in a recording medium and the obtained recording medium is delivered to the service provider, whenever a new recording medium is used, the information on the applicant for the service must be recorded in the recording medium.

In addition, there is known a technology by which commercial goods are managed, involving appending an article of commerce with an IC tag for merchandise management, the IC tag having a storing unit capable of reading/writing data from/into the storing unit, and reading information on the article of commerce stored in the storing unit by using an IC reader/writer (see Japanese Patent Application Laid-open No. 2004-213372).

A conventional IC tag usually is removed from an article of commerce with which it is appended and disposed of once the article of commerce is sold. Therefore, various pieces of information stored in the IC tag could not be used utilized after the article of commerce appended with the IC tag has been sold.

SUMMARY OF THE INVENTION

The digital camera according to a first aspect of the present invention includes a photographing unit that takes an image of a subject; a recording unit that records digital image data of the image taken by the photographing unit; and a communication unit that wirelessly transmits/receives data to/from an external device capable of wirelessly transmitting/receiving data. The communication unit acquires data on the external device related to photographing from the external device in association with the photographing by the photographing unit. The recording unit records the digital image data in relation to the data on the external device acquired by the communication unit.

The digital camera according to a second aspect of the present invention includes: a digital camera unit including a photographing unit that takes an image of a subject; a recording unit that records digital image data of the image taken by the photographing unit; an inputting unit with which an instruction for photographing by the photographing unit is input; and a first controlling unit that controls each of the image-capturing unit, the recording unit, and the inputting unit; and a contactless inputting/outputting unit including a first antenna unit that transmits/receives radio waves therethrough, a first storing unit that stores information, and a second controlling unit that controls memories in the first storing unit. The contactless inputting/outputting unit transmit/receives data to/from an external device. The first controlling unit receives data acquired by the second controlling unit from the external device.

In the digital camera according to the second aspect of the present invention, the contactless inputting/outputting unit induces power for operating the external device in the external device by the radio waves transmitted from the first antenna unit and then transmits/receives data to/from the external device.

The external device may include a second antenna unit that transmits/receives radio waves therethrough; a second storing unit that stores data; and a third controlling unit that controls memories in the second storing unit, and the external device may transmit/receive the data stored in the second storing unit to/from the contactless inputting/outputting unit, preferably using power induced in the second antenna unit when the second antenna unit receives radio waves therethrough from outside.

The external device may be fixed to an accessory of the digital camera.

The contactless inputting/outputting unit may receive data from the external device, and the first controlling unit may controls the units to receive the data that has been received from the external device through the second controlling unit and record the received data in the recording unit in relation to the image data.

The contactless inputting/outputting unit may receive data from the external device, and the first controlling unit may controls the units to receive the data that has been received from the external device through the second controlling unit and change control on each unit of the digital camera unit based on the received data.

The first controlling unit may issue an instruction to the second controlling unit to cause the second controlling unit to read-in data from the external device in response to an instruction for image-capturing to the inputting unit.

The inputting of an instruction for image-capturing to the inputting unit may be performed either by halfway pressing down a shutter release button or by fully pressing down the shutter release button.

In the digital camera according to the second aspect of the present invention, the first controlling unit may change exposure control or contents of image processing.

The first controlling unit may issue an instruction to the second controlling unit to record data relating to a use history of the external device in the second storing unit of the external device in response to an instruction for image-capturing to the inputting unit. Also, the first controlling unit may issue an instruction to the second controlling unit to record data relating to a use history of the external device in the second storing unit of the external device after a predetermined length of time from inputting an instruction for image-capturing to the inputting unit. Further, the first controlling unit may issue an instruction to the second controlling unit to record data relating to a use history of the external device in the second storing unit of the external device after completion of image processing on an image taken by the photographic unit in response to an input of an instruction for image-capturing to the inputting unit.

The digital camera according to a third aspect of the present invention includes: a digital camera unit including a photographing unit that takes an image of a subject; a recording unit that records digital image data of the image taken by the photographing unit; an inputting unit with which an instruction for photographing by the photographing unit is input; and a first controlling unit that controls each of the photographing unit, the recording unit, and the inputting unit; and a contactless inputting/outputting unit that transmits/receives data to/from an external device. The contactless inputting/outputting unit receives data from the external device, the first controlling unit controls the units to receive the data that has been received from the external device through the contactless inputting/outputting unit and records the received data in the recording unit in relation to the image data.

The digital camera according to a fourth aspect of the present invention includes: a digital camera unit including a photographing unit that takes an image of a subject; a recording unit that records digital image data of the image taken by the photographing unit; an inputting unit with which an instruction for photographing by the photographing unit is input; and a first controlling unit that controls each of the photographing unit, the recording unit, and the inputting unit; and a contactless inputting/outputting unit that transmits/receives data to/from an external device. The contactless inputting/outputting unit receives data from an external device, and the first controlling unit controls the units to receive the data that has been received from the external device through the second controlling unit and change control on each unit of the digital camera unit based on the received data.

The digital camera according to a fifth aspect of the present invention includes: a digital camera unit including a photographing unit, a first storing unit that stores at least the image taken by the photographing unit, and a first controlling unit that controls a memory in the first storing unit; and an IC memory unit including an antenna unit that receives radio waves therethrough, a second storing unit that stores data, and a second controlling unit that controls a memory in the second storing unit, the IC memory unit reading/writing data from/into the second storing unit by wirelessly transmitting/receiving the data to/from an external device through the antenna unit using power induced in the antenna unit when the antenna unit receives radio waves therethrough. In this digital camera, the memory in the second storing unit is also controlled by the first controlling unit.

In the digital camera according to the fifth aspect, the first storing unit may store a first program for controlling operation of the digital camera. The second storing unit may store data for changing operation of the digital camera based on the first program. The first controlling unit may acquire the data stored in the second storing unit and change the operation of the digital camera based on the acquired data.

The data for changing the operation of the digital camera may be acquired from the external device through the antenna unit and rewritten into the second storing unit.

The first controlling unit may acquire data for changing the operation of the digital camera from the second storing unit when the power of the digital camera is turned ON. The first controlling unit may acquire data for changing the operation of the digital camera in a predetermined mode from the second storing unit when the digital camera is set to the predetermined mode.

In the digital camera according to the fifth aspect, the data for changing the operation of the digital camera are changed depending on a place to which the digital camera is shipped.

The data for changing the operation of the digital camera may be either data enabling the operation of the digital camera or data disabling the operation of the digital camera. On this occasion, the second storing unit may store the data enabling the operation of the digital camera when sales information on the digital camera that the digital camera has been sold is stored in the second storing unit.

In the digital camera according to the fifth aspect, the data for changing the operation of the digital camera may be acquired from the external device through the antenna unit and written into the second storing unit. On this occasion, the first controlling unit may be configured to acquired the data for changing the operation of the digital camera from the second storing unit when the digital camera is first turned ON or when the digital camera is first set to a predetermined mode after the data for changing the operation of the digital camera have been written into the second storing unit.

The second storing unit may be configured to store a second program to be used by the second controlling unit. On this occasion, the first controlling unit may transmit data to be processed by the second program to the second controlling unit through communication with the second controlling unit, receive data processed by the second program, and control operation of the digital camera based on the processed data.

The second storing unit may be configured to store the first program. On this occasion, the first controlling unit may acquire the first program from the second storing unit and store the first program in the first storing unit.

The first controlling unit may temporarily store data of image taken by the digital camera unit.

The second storing unit may be configured to be integral with the first storing unit. The first controlling unit may be configured to include the second controlling unit or the first storing unit may be configured to include the second storing unit.

The electronic device according to a sixth aspect of the present invention includes: an electronic device unit including a function unit, a first storing unit that stores a first program for controlling operation of the function unit, and a first controlling unit that controls memory in the first storing unit; and an IC memory unit including an antenna unit that receives radio waves therethrough, a second storing unit that stores data, and a second controlling unit that controls a memory in the second storing unit. The IC memory unit reads writes data from/into the second storing unit by wirelessly transmitting/receiving the data to/from an external device through the antenna unit. The memory in the second storing unit is also controlled by the first controlling unit.

In the digital camera according to the sixth aspect, the digital camera may further include a recording unit that records an image taken by the photographing device. On this occasion, the first controlling unit may be configured to control recording by the recording unit.

The second storing unit may store therein owner information relating to an owner of the digital camera received from the external device through the antenna unit. On this occasion, the first controlling unit acquire the owner information stored in the second storing unit and records the owner information in the recording medium.

The first controlling unit may record the image taken by the photographing unit in relation to the owner information.

The second storing unit may record distribution information on distribution history of the digital camera received from the external device. On this occasion, the first controlling unit may acquire the distribution information stored in the second storing unit and records the distribution information in the recording medium.

The first controlling unit may record at least one of the distribution information and the owner information as a hidden file in the recording medium.

The first controlling unit may record at least one of the distribution information and the owner information in the recording medium when the recording medium is mounted on the digital camera. On this occasion, the first controlling unit may be configured to output the owner information and the distribution information when the image data recorded in the recording medium are output to outside.

According to a seventh aspect of the present invention, there is provided a service providing apparatus with a computer for providing a service using image data of an image taken by a digital camera, the apparatus includes: a data reading unit that reads the image data; and a service providing unit that provides a service based on the image data read by the data reading unit. The data reading unit reads at least one of owner information relating to an owner of the digital camera by which the image data has been created and distribution information relating to distribution of the digital camera when the image data are read.

In the service providing apparatus according to the seventh aspect, the data reading unit may read at least one of the owner information and the distribution information from the recording medium mounted on the digital camera. The data reading unit may read the image data and at least one of the owner information and the distribution information from an external device connected thereto. When there is a plurality of image data, the data reading unit may read each image data and corresponding owner information in relation to one another.

The service providing apparatus may further include: a reception unit that creates a reception data based on the owner information read by the data reading unit or a judging unit that judges whether or not distribution of the digital camera that has created the image data is appropriate based on the distribution information read by the data reading unit.

The distribution management system according to an eight aspect of the present invention includes: a digital camera; and a contactless data inputting/outputting device that wirelessly transmits/receives data to/from the digital camera. The digital camera includes a digital camera unit having a photographing unit that takes an image of a subject; and a recording unit that records digital image data of the image captured by the photographing unit into a recording medium mounted thereon; and an IC memory unit that is undetachable from the digital camera unit. The IC memory unit includes a first antenna unit that transmits/receives radio waves therethrough, a first storing unit that stores data, and a first controlling unit that controls memories in the first storing unit. The IC memory unit is capable of reading/writing data from/into the first storing unit by wirelessly transmitting/receiving the data to/from outside through the antenna unit. The contactless data inputting/outputting device includes a second antenna unit that transmits/receives radio waves therethrough, a second storing unit that stores data, and a second controlling unit that controls memories in the second storing unit. The contactless data inputting/outputting device wirelessly transmits/receives data to/from the IC memory unit through the second antenna unit to read the data stored in the first storing unit into the second storing unit and write the data stored in the second storing unit into the first storing unit.

The digital camera unit may further include a third storing unit that stores a program that controls operation of the digital camera unit, and a third controlling unit that controls memories in the third storing unit, while the memories in the first storing unit are also controlled by the third controlling unit. The first storing unit may store data for changing operation of the digital camera unit based on the program. The contactless data inputting/outputting device may store data for selecting one of different operations of the digital camera unit in the second storing unit, and in a process of distribution of the digital camera, the contactless data inputting/outputting device may write the distribution information into the first storing unit and the data stored in the second storing unit into the first storing unit.

In the distribution management system according to the eighth aspect, the data for changing operation of the digital camera unit stored in the first storing unit may be either data enabling the operation of the digital camera unit or data disabling the operation of the digital camera unit. On this occasion, the first storing unit may store data disabling the operation of the digital camera unit by the program as the data for changing operation of the digital camera unit. On the other hand, the contactless data inputting/outputting device may store data enabling operation of the digital camera unit in the second storing unit as data for selecting one of different operations of the digital camera unit and at the same time overwrite the data disabling the operation of the digital camera stored in the first storing unit by the data enabling the operation of the digital camera stored in the second storing unit.

The distribution information may be sales information on the digital camera and may be written into the first storing unit when the digital camera has been sold. In addition, the contactless data inputting/outputting device may write sales information that the digital camera has been sold into the first storing unit upon sales processing of the digital camera.

The first storing unit may store sales information on the digital camera. On this occasion, the contactless data inputting/outputting device may be connected to a computer and may read the sales information stored in the first storing unit and transmit the data to the computer. The computer may determine how to provide service to the digital camera based on the sales information. In addition, the computer may judge whether or not the digital camera is within a warranty period for service and determine how to provide the service based on the result of judgment.

The contactless inputting/outputting device may further read unique information on the digital camera and owner information stored in the first storing unit and may transmit the data to the computer. On this occasion, the computer may create service management data based on the unique information and the owner information.

The contactless inputting/outputting device may write owner information relating to an owner of the digital camera into the first storing unit. In addition, the contactless data inputting/outputting device may be connected to a computer, and the owner information may be input into the computer and written into the second storing unit from the computer.

In the distribution management system according to the eighth aspect, the digital camera unit may further include an inputting unit. On this occasion, the third controlling unit may compare a password stored in the third storing unit and when a password input into the inputting unit coincides with the password stored in the third storing unit, the owner information stored in the first storing unit may be replaced by the owner information input into the inputting unit.

The contactless data inputting/outputting device may write sales information that the digital camera has been sold and the owner information relating to the owner into the first storing unit upon sales processing of the digital camera. The contactless data inputting/outputting device may write distribution information relating to distribution of the digital camera into the first storing unit.

The digital camera unit may further include a third storing unit that stores a program for controlling operation of the digital camera unit and a third controlling unit that controls memories of the third storing unit. On this occasion, the memories in the first storing unit may be controlled also by the third controlling unit. On this occasion, the first storing unit stores information relating to the program. The contactless data inputting/outputting device may write the information relating to the program into the first storing unit when the contactless data inputting/outputting device writes at least one piece of information selected from the group consisting of sales information of the digital camera, owner information, and distribution information into the first storing unit.

The data written in the first storing unit after reading the same from the second storing unit may be distribution information relating to distribution of the digital camera. On this occasion, the data written in the second storing unit after reading the same from the first storing unit may include unique information specific to respective digital cameras.

The distribution information and the unique information may be read/written at a distribution center for the digital camera.

The distribution management system according to the eighth aspect may further include a computer to which the contactless data inputting/outputting device is connected. On this occasion, the computer may read/write data from/into the second storing unit.

The computer may be a computer for managing distribution of the digital camera, and the data may be information data relating to distribution of the digital camera.

The distribution management system according to a ninth aspect of the present invention includes an electronic device and a contactless data inputting/outputting device that wirelessly transmits/receives data to/from the electronic device. The electronic device includes an electronic device unit that performs functions of the electronic device, a first antenna unit that receives radio waves therethrough, a first storing unit that stores data, a first controlling unit that controls a memory in the first storing unit, and an IC memory unit undetachable from the electronic device unit, the IC memory unit reading/writing data from/into an outside by wirelessly transmitting/receiving the data to/from the outside through the antenna unit. The contactless data inputting/outputting device includes a second antenna unit that transmits/receives radio waves therethrough, a second storing unit that stores data, and a second controlling unit that controls memories in the second storing unit, the contactless data inputting/outputting device wirelessly transmitting/receiving data to/from the IC memory unit through the second antenna unit to read the data stored in the first storing unit and write the same into the second storing unit and write the data stored in the second storing unit into the first storing unit.

In the distribution management system, the electronic device may include a third storing unit that stores a program that controls operation of the digital camera unit, and a third controlling unit that controls memories in the third storing unit, while the memories in the first storing unit are also controlled by the third controlling unit. The first storing unit may store either data enabling the operation of the digital camera unit or data disabling the operation of the digital camera unit. The contactless data inputting/outputting device may store data enabling operation of the electronic device in the second storing unit and write sales information that the digital camera has been sold into the first storing unit when the electronic device has been sold and at the same time replace data disabling operation of the electronic device stored in the first storing unit by the data enabling operation of the electronic device stored in the second storing unit.

It is to be noted that the photographing unit, the recording unit, the inputting unit, the first controlling unit, the first storing unit, the contactless inputting/outputting unit, the second storing unit, and the second controlling unit may be replaced by photographing means, storing means, inputting means, first controlling means, first storing means, contactless inputting/outputting means, second storing means, second controlling means, respectively. The image-capturing unit, the third storing unit, the third controlling unit, the data reading unit, the service providing unit, the reception unit, and the judging unit may be replaced by photographing means, third storing means, third controlling means, data reading means, service providing means, reception means, and judging means, respectively.

ADVANTAGEOUS EFFECT OF THE INVENTION

With the digital camera of the present invention, information on accessories used in image-capturing can be automatically obtained.

In addition, according to the present invention, the program installed in the digital camera unit or electronic device unit or parameters referenced by the program can be readily changed.

In addition, according to the present invention, a variety of information relative to the digital camera that has captured images can be delivered to a service provider without taking much trouble.

Further, according to the present invention, there can be provided a distribution management system for commercial goods in which the information stored in an IC tag can be utilized after the goods have been sold.

BRIEF DESCRIPTION OF THE DRAWINGS

FIG. 7 is a table showing a relationship between values of parameters prepared in advance and the language used;

FIRST EMBODIMENT

Figure 1:
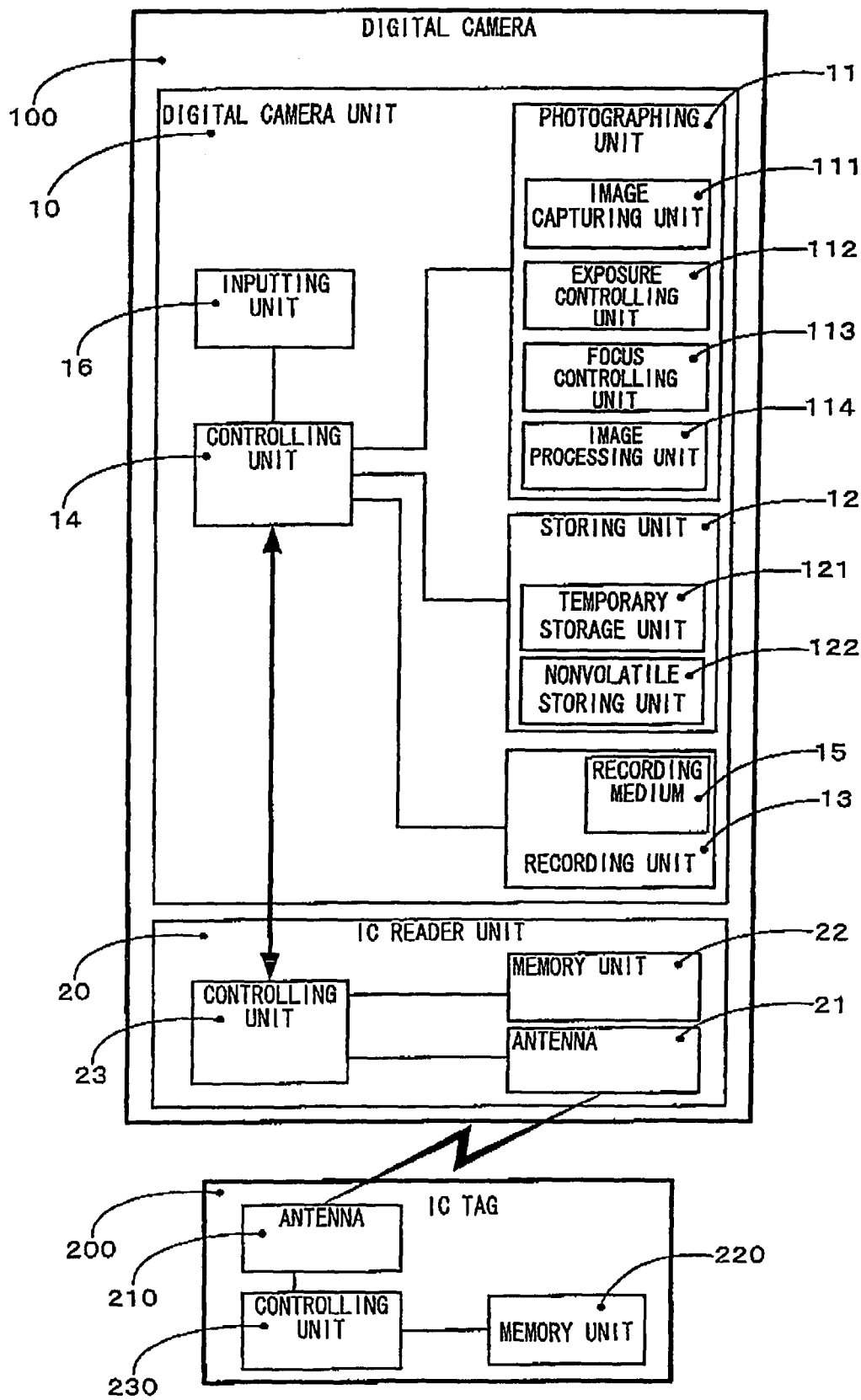
FIG. 1 is a block diagram presenting a configuration a digital camera according to a first embodiment.

FIG. 1 is a block diagram presenting a configuration of a digital camera according to a first embodiment of the present invention.

A digital camera 100 according to the first embodiment, which includes a digital camera unit 10 and an IC reader unit (IC tag reader unit) 20, transmits and receives various data to and from an IC tag 200.

The digital camera unit 10 has a configuration and functions that commercially available digital cameras commonly have and includes a photographing unit 11, a storing unit 12, a recording unit 13, a controlling unit 14, and an inputting unit 16. The photographing unit includes at least an image capturing unit 111, an exposure controlling unit 112, a focus controlling unit 113, and an image processing unit 114. The storing unit 12 includes a temporary storing unit 121 that temporarily stores data of the image captured by the photographing unit 11 and a nonvolatile storing unit 122 that stores a program to be implemented by the controlling unit 14. The recording unit 13 transfers the image stored in the temporary storing unit 121 to the recording medium 15

The IC reader unit 20 includes an antenna unit 21, a memory unit 22, and a controlling unit 23 and transmits/receives signals having a predetermined frequency (for example, 13.65 MHz) to/from the IC tag 200 based upon instructions from the digital camera unit 10. Specifically, the IC reader unit 20 reads in data recorded in the memory unit 220 of the IC tag 200 or writes predetermined data into the memory unit 220.

The IC tag 200 is fixed to an accessory of the digital camera 100. Examples of the accessory of the digital camera include an image-capturing lens, a strobe unit, various types of filters and hoods attached to the front of the image-capturing lens, a close-up lens, a conversion lens attached between an interchangeable lens and the camera main body, a close-up ring, a shutter release cable, and a tripod.

The IC tag 200 includes at least an antenna unit 210, a memory unit 220, and a controlling unit 230. When the IC tag 200 receives radio waves output from the IC tag reader unit 20, power is induced in the antenna unit 210 due to electromagnetic induction, and the IC tag 200 becomes operable. The antenna unit 210 transmits/receives signals having the predetermined frequency as described above to/from the IC reader unit 20. That is, the data recorded in the memory unit 220 are transmitted to the IC reader unit 20 through the antenna unit 210 and the data received by the antenna unit 210 are recorded in the memory unit 220. It is to be noted that the IC tag 200 may be an IC tag of the type having a battery therein and performs the above described operation with the power supplied from the battery.

It is to be noted that the characteristics of the IC reader 20 and the IC tag 200, such as transmission/reception performances, are set such that when the IC reader 20 transmit/receive data to/from the IC tag 200, the communicable distance therebetween is within several tens centimeters (cm). In addition, the IC reader unit 20 can transmit/receive data to/from a plurality of IC tags 200 simultaneously, with distinguishing the IC tags one from another.

A part of exterior components of the digital camera 100 includes a member made of a material transparent to radio waves, such as plastic. The antenna unit 21 in the IC reader unit 20 is arranged inside the member transparent to radio waves.

Records in the IC tag 200 can be read/written by an IC reader other than the IC reader unit 20. It is to be noted that the technology to read/write data from/into the memory unit 220 of the IC tag 200 by an IC reader is a well known technology that has been put into practice, so detailed explanation on the processing of reading/writing data by the IC reader unit 20 is omitted here.

The controlling unit 23 of the IC reader unit 20 is connected to the controlling unit 14 of the digital camera 10 and the controlling unit 23 can transmit/receive data to/from the controlling unit 14.

Here, the respective units 21 to 23 of the IC reader 20 preferably are arranged on the same substrate as that on which the controlling unit 14 and the storing unit 12 of the digital camera 10 are arranged. The arrangement of the units on the same substrate allows simultaneous fabrication of the respective components of the IC reader unit 20 in the production process of the respective units of the digital camera unit 10, so that production cost can be decreased.

Figure 2:
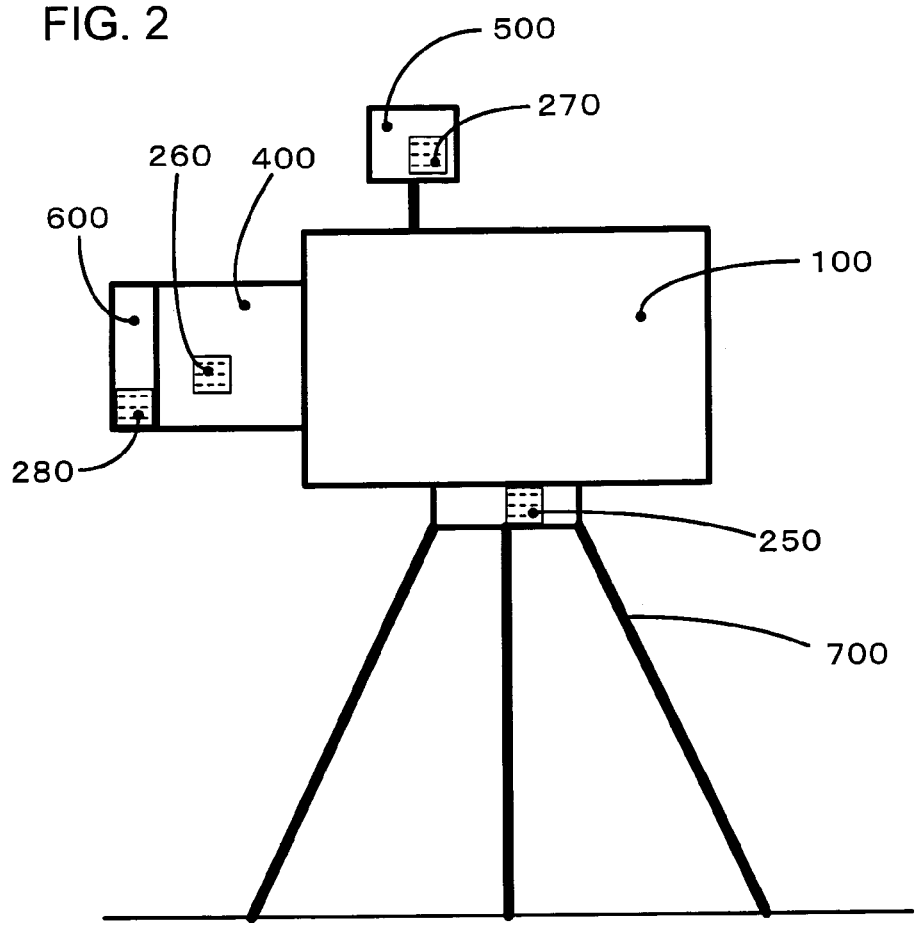
FIG. 2 is a diagram illustrating a digital camera arranged on a tripod.

FIG. 2 is a diagram illustrating the state in which the digital camera 100 is mounted on a tripod 700 for image-capturing. The digital camera 100 is fitted with a strobe unit 500 and a photographic lens 400. On the front end of the photographic lens 400 is attached a filter 600. The photographic lens 400 can be exchanged with other photographic lenses as appropriate. Similarly, the filter 600 can be exchanged with other filters as appropriate.

Some of the accessories are electrically connected to the digital camera main body and capable of being controlled of operation based on signals from the digital camera main body or have a storing unit having stored therein information relative to the accessory and are capable of transmitting information on the accessory to the digital camera main body whereas others do not have such a function. The accessories of the former type include, for example, image-capturing lenses having AF (autofocusing) function or strobe units. The accessories of the latter type include, for example, various filters or hoods, close-up lenses to be attached to the front end of the image-capturing lens, a conversion lens to be attached between an interchangeable lens and the digital camera main body, a close-up ring, a shutter release cable, and a tripod. In FIG. 2, the image-capturing lens 400 and the strobe unit 500 correspond to the accessories of the latter type and does not have the function of transmitting information on the accessories to the digital camera main body.

The accessories (the photographic lens 400, the strobe unit 500, and the filter 600, the tripod 700) have attached thereto IC tags 250, 260, 270, and 280, respectively, undetachably or hardly detachably. Hereafter, IC tags 250 to 280 attached to respective accessories are collectively called as an IC tag 200. The IC tags 250 to 280 attached to respective accessories have recorded therein information on the accessories. The information on the accessory includes information that distinguishes manufacturers, types, and brands of accessories. The information can be read, for example, by an IC reader set at the dealer and used as data for merchandise management or sales management. The information on accessories may further include information indicating characteristics of the accessory, for example, spectroscopic permeability of a filter.

The controlling unit 14 of the digital camera 100 issues an instruction to the controlling unit 23 of the IC reader unit 20 to cause the controlling unit 23 to transmit/receive information to/from the IC tag 200. The controlling unit 23 sends radio waves through the antenna 21 to perform operation for reading information from the IC tag 200. This allows the information on the accessory to be read from all the IC tags 200 within the communicable distance range and recorded in the memory unit 22 by the IC reader unit 20. It is to be noted that "upon image-capturing" means at the time when the shutter release button of the digital camera unit 10 is fully pressed down or halfway pressed down. To place priority on processing of the captured image data, the information on the accessory may be read-in and recorded in the memory unit 22 after a predetermined length of time has elapsed from full pressing down of the shutter release button of the digital camera unit 10 or after the processing of image data has been completed. That is, the timing when to acquire the information on the accessory may be determined depending on how to use the information read out from the IC tag.

As described above, information on all the accessories that are attached to the digital camera 100 are read from the IC tags 200 appended to the respective accessories by the IC reader unit 20 and recorded into the memory unit 22. The IC reader unit 20 is communicable within a distance range on the order of several tens centimeters (cm), so that information can be read from IC tags attached to accessories connected to the digital camera 100 and accessories in the vicinity of the digital camera 100. On the other hand, no information can be read from IC tags attached to those accessories carried by the user but not used, that is, those accessories that are not in the vicinity of the digital camera 100 upon image-capturing.

When recording the image data of the captured image to the recording medium 15 attached to the recording unit 13, the controlling unit 14 acquires the information recorded in the memory unit 22 through the controlling unit 23 and records the information in relation to the image data. The information acquired from the memory unit 22 is recorded in, for example, a header portion of the image data. As a result, information on which accessory has been used at the time of capturing an image is automatically appended to the respective image data.

It is to be noted that the information to be appended to the image data, that is, the information recorded in the memory unit 22 should be information acquired at latest image-capturing. For this purpose, the controlling unit 14 erases the information already recorded in the memory unit 22 simultaneously with acquiring the information from the memory unit 22. Instead of erasing the information, the controlling unit 23 may be configured to manage the information acquired at the latest image-capturing and the previous information distinctly one from another. It is to be noted that the controlling unit 14 can acquire the information on the IC tag 200 received by the antenna unit 21 directly from the controlling unit 23 without intermediacy of the memory unit 22.

Further, the controlling unit 14 judges the type of accessory being used based on the information acquired from the IC tag 200 and changes control of the operation of the digital camera unit 10 based on the result of the judgment. For instance, if it is judged that a tripod is used, the control is changed such that automatic exposure is adopted to allow exposure of a longer duration. This is because if a tripod is used, there is less possibility of camera shake.

In addition, the controlling unit 14 may be configured to judge the type of photographic lens being used and change the method of processing images to be performed inside the digital camera 100 depending on the optical characteristics of the photographic lens. On the other hand, if it is judged that a specified filter is used, the method of processing images to be performed inside the digital camera 100 may be changed depending on the optical characteristics of the filter. On this occasion, the digital camera 100 should be provided with an image data processing program for processing images by a method depending on the optical characteristics. In addition, the optical characteristics have been recorded in advance in an IC tag attached to a photographic lens or a filter and acquired by the digital camera unit 10 through the IC reader unit 20.

Generally, the above described image processing depending on the optical characteristics of the photographic lens or filter is achieved by the following procedure. That is, the image captured by a digital camera is recorded as RAW data, which are read by a computer having stored therein the optical characteristics of the photographic lens and of filter as well as a correction program and correction is performed as a post-processing operation after the image-capturing.

In contrast, the digital camera 100 according to the first embodiment does not require any special operation by the user even when the image-capturing lens or filter is frequently exchanged and image data of an appropriately corrected image are created in the digital camera 100 simultaneously with image-capturing. That is, the post-processing operation by the computer as described above is not required.

The controlling unit 23 further issues radio waves through the antenna unit 21 and additionally writes information into the memory unit 220 of the IC tag 200. It is only necessary that the writing processing is performed up until next image-capturing. Accordingly, the priority is placed on processing of the captured image and is performed after a predetermined length of time from the implementation of image-capturing. The predetermined length of time is determined based on the time required for image processing by the image processing unit 114 and writing into the recording medium 15 by the recording unit 13. It is to be noted that the writing processing may be performed when the image processing by the image processing unit 114 or writing into the recording medium 15 by the recording unit 13 has been completed.

The information to be written into the memory unit 220 is, for example, date and hour information of image-capturing. The date and hour information can be obtained from a clock unit (not shown) in the IC reader unit 20 or a clock unit (not shown) in the digital camera unit 10 through the controlling unit 14. As a result, the IC tag 200 attached to the accessory can record therein a use history of the accessory.

Reading out the use history of an accessory from the IC tag 200 attached to the accessory by using an IC reader enables one to know how frequently the accessory has been used and the use history can be used as information for making various decisions based on the frequency of use of the accessory. For instance, the use history can be used as a reference when buying a new accessory or a similar accessory, or when choosing an accessory to be carried on.

Figure 3:
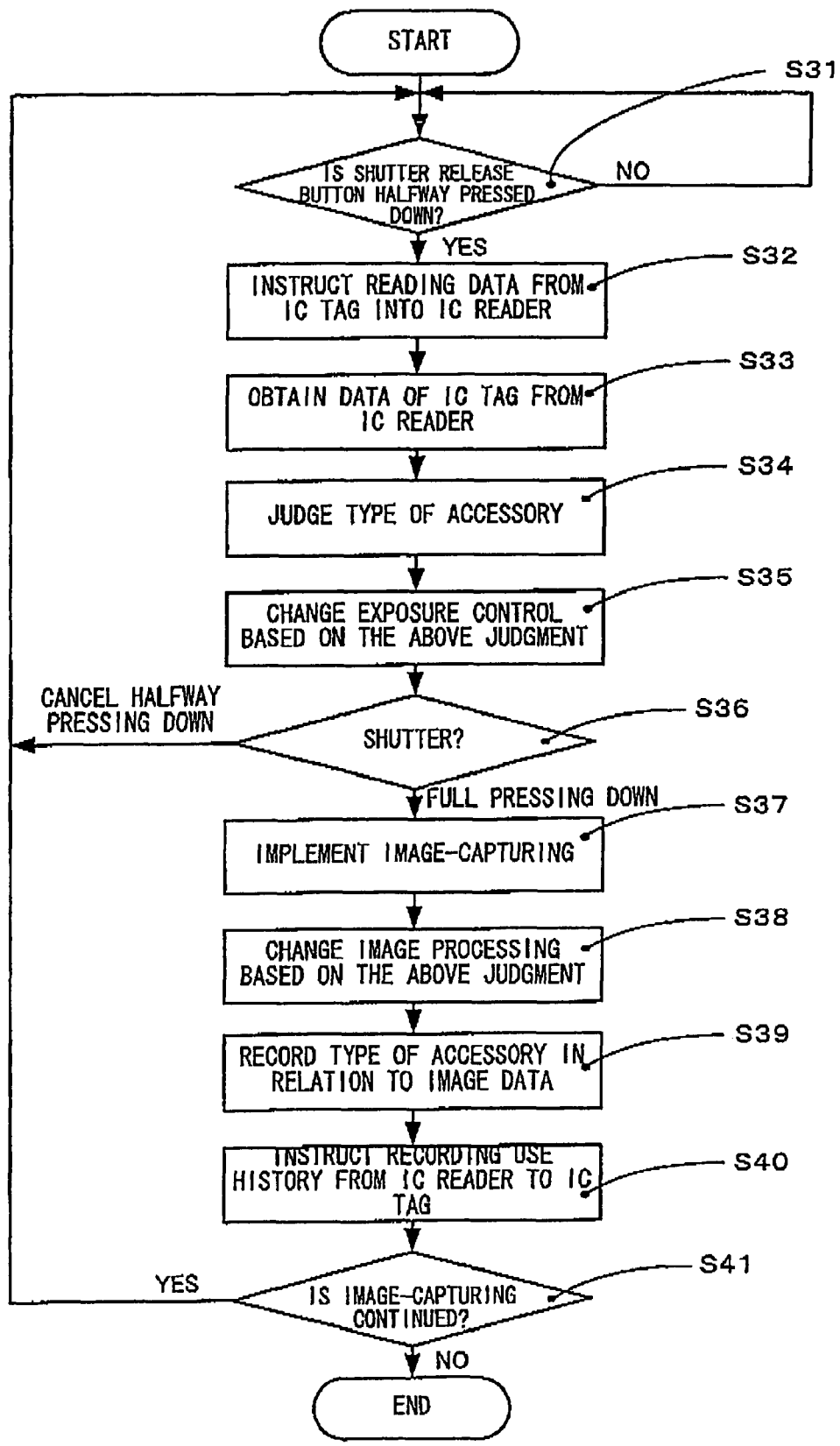
FIG. 3 is a flowchart illustrating an example of a series of procedures to be performed by the controlling unit of the digital camera unit.

An example of flow of procedures performed by the controlling unit 14 of the digital camera unit 10 is explained referring to the flowchart shown in FIG. 3. That is, when the digital camera 100 is set to an image-capturing mode in which image-capturing is possible, the process of step S31 is started.

In step S31, whether or not there is an input that instructs image-capturing in the inputting unit 16 is judged. The input that instructs image-capturing is a halfway pressing operation of a shutter release button. When it is judged that no input that instructs image-capturing is present in the inputting unit 16, the procedure stands by in step S31, whereas when it is judged that there is such an input, the procedure proceeds to step S32.

In step S32, a request is given to the controlling unit 23 in the IC reader 20 to provide data recorded in the memory unit 22 of the IC tag 200. That is, the controlling unit 23 is instructed to read-in the data from the IC tag 200 and transmit the read data. According to this instruction, the controlling unit 23 acquires data relating to the accessory from the IC tag 200 and record the data in the memory unit 22.

In step S33 following step 32, the data relating the accessory recorded in the memory unit 22 is acquired. As described above, the data relating to the accessory recorded in the memory unit 22 is not limited to one but may be in plural numbers.

In step S34 following step S33, the type of accessory corresponding to the data is judged based on the acquired data. In step S35 following step S34, if the type of the accessory judged in step S34 is an accessory that influences on exposure control, the method of controlling exposure is changed depending on the type of the accessory. When the method of controlling exposure is changed depending the type of the accessory, the procedure proceeds to step S36.

In step S36, it is judged whether the shutter release button has been fully pressed down or halfway pressing down has been canceled. If it is judged that the shutter release button has been fully pressed down, the procedure proceeds to step S37, whereas if it is judged that halfway pressing of the shutter release button has been canceled, the procedure returns to step S31.

In step S37, the image of a subject is captured by using the changed method of controlling exposure and the procedure proceeds to step S38. In step S38, if the type of the accessory judged in step S34 is an accessory that influences on the image processing, the method of processing image is changed and processing of the image data of the image procured in step S37 is performed by the changed image processing method.

In step S39 following step S38, the information relating to the type of the accessory judged in step S34 is recorded in relation to the image data in the recording medium 15. In step S40 following step S39, the controlling unit 23 in the IC reader 20 is instructed to record date and hour data as a use history in the IC tag.

In step S41 following step S40, it is judged whether the image-capturing mode is continued or not. If it is judged that the image-capturing mode is continued, the procedure returns to step S31 and the operations in step S31 or thereafter are repeated, whereas if it is judged that the image-capturing mode is not continued, the procedure is ended.

Although it is preferred to implement the procedure by detecting halfway pressing of the shutter release button in step S31, performing operations in steps S32 to S35, detecting full pressing down of the shutter release button in step S36, and then performing operations in steps S37 to S41 as described above, the procedure may be implemented by detecting full pressing down of the shutter release button in step S31 and then perform all the operations in step S32 to step S41.

Figure 4:
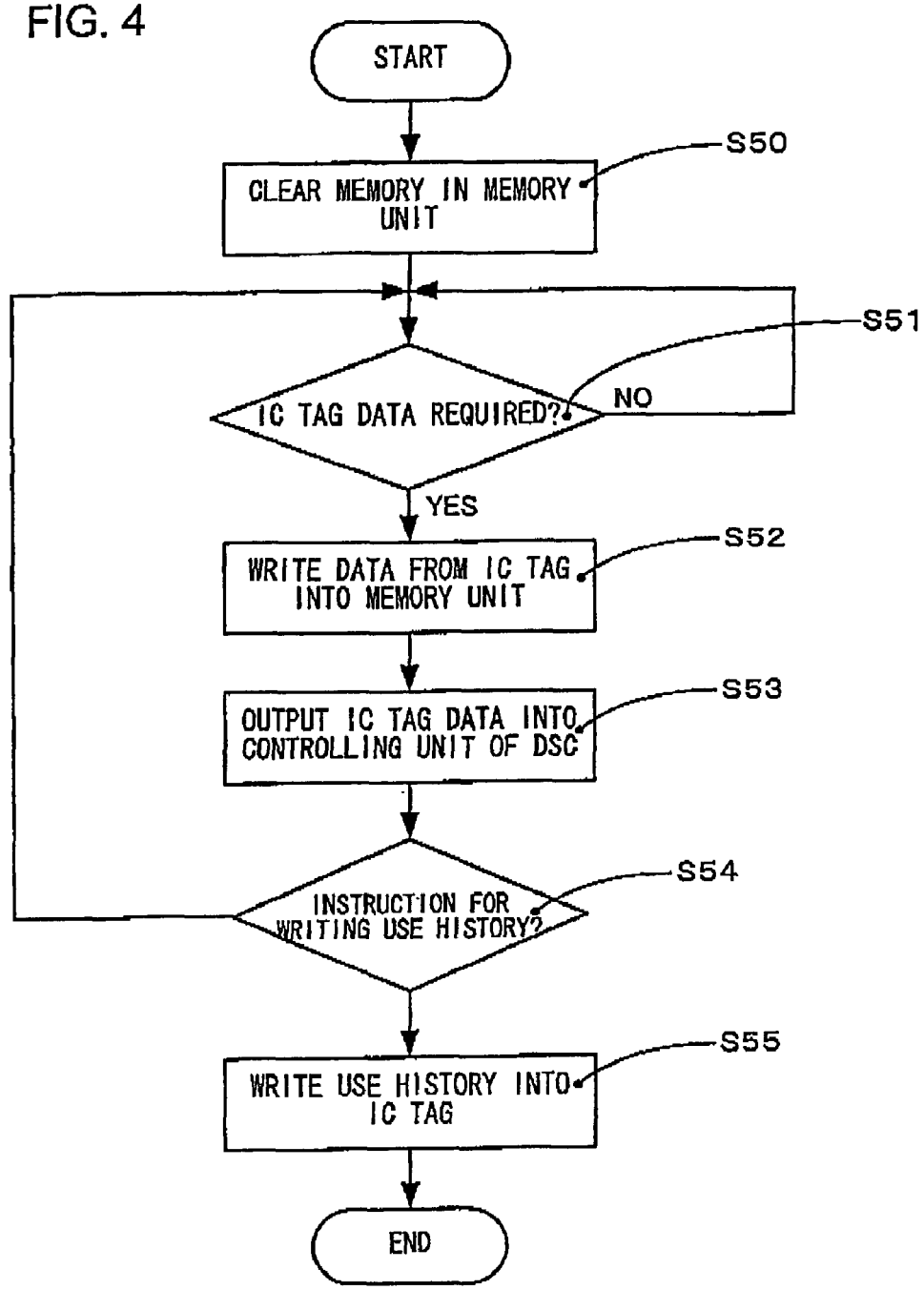
FIG. 4 is a flowchart illustrating an example of a series of procedures to be performed by the IC reader unit.

Next, in connection with the operation of the controlling unit 14 as described above, an example of the flow of operations performed by the controlling unit 23 of the IC reader unit 20 is explained referring to the flowchart shown in FIG. 4. That is, when the digital camera 100 is set to an image-capturing mode in which image-capturing is possible, the procedure in step S50 is started.

In step S50, the recordation in the memory unit 22 is cleared and the procedure proceeds to step S51. In step S51, it is judged whether or not there has been made a request from the controlling unit 14 of the digital camera unit 10 for the data recorded in the memory unit 220 of the IC tag 200. If it is judged that there has been no such a request, the procedure stands by in step S51, whereas if it is judged that there has been a request for the data, the procedure proceeds to step S52.

In step S52, radio waves to induce power in the antenna unit 210 of the IC tag 200 is transmitted from the antenna unit 21 and the data recorded in the memory unit 220 of the IC tag 200 is read-in and recorded in the memory unit 22. In step S53 following step S52, the data read-in from the IC tag 200 is output to the controlling unit 14 of the digital camera unit 10.

In step S54 following step S53, it is judged whether there has been an instruction to write a use history from the controlling unit 14 into the IC tag 200. If it is judged that there has been no such instruction, the procedure stands by in step S54, whereas if it has been judged that there has been such an instruction, the procedure proceeds to step S55.

In step S55, radio waves are transmitted from the antenna unit 21 in order to record a use history such as date and hour data in the IC tag 200. The controlling unit 230 of the IC tag 200 having received the radio waves records the use history data in the memory unit 220. When the use history data is recorded in the memory unit 220, the operation performed in the controlling unit 23 is completed.

The digital camera according to the first embodiment acquires information relating to accessories from an external device (IC tag) upon image-capturing and records the information in relation to the image data of the acquired image in the recording medium 15, so that the information relating to the accessories used for image-capturing can be acquired automatically. As a result, the user need not manually input the information relating to the accessories for each image-capturing.

In addition, the digital camera according to the first embodiment changes controlling upon image-capturing based on the information relating to the accessories that has been automatically acquired, so that appropriate image-capturing can be achieved depending on the type of the accessory. In addition, the digital camera according to the first embodiment changes the method of data processing of the captured image based on the automatically acquired information on the accessories, so that appropriate image processing depending on the type of the accessory can be achieved.

It is to be noted that the flow of the procedure shown in FIG. 3 or FIG. 4 is only exemplary and the order of operations may be changed or a part of the operations may be omitted. As needed, other operations may be added to appropriate points of execution. In any of the flowcharts, the procedure is ended also when the image-capturing mode of the digital camera 100 is canceled.

Although a tripod, an image-capturing lens, a strobe unit, and a filter have been exemplified as accessories in the above explanation, the type of the accessories is not limited thereto. Examples of accessories of digital cameras include various types of filters and hoods attached to the front of an image-capturing lens, close-up lens, conversion lens attached between an interchangeable lens and a camera main body, a close-up ring, a shutter release cable, and a tripod. That is, accessories include all that are used as attached to the digital camera, such as those electrically connected to the digital camera main body and whose operation is controlled based on signals from the digital camera main body or those having a storing unit that has recorded therein information relating to the accessory and capable of transmitting the information in the storing unit to the digital camera main body. In addition, the present invention can be applied to those accessories that are not directly attached to the digital camera main body but are used in the vicinity thereof.

Figure 5:
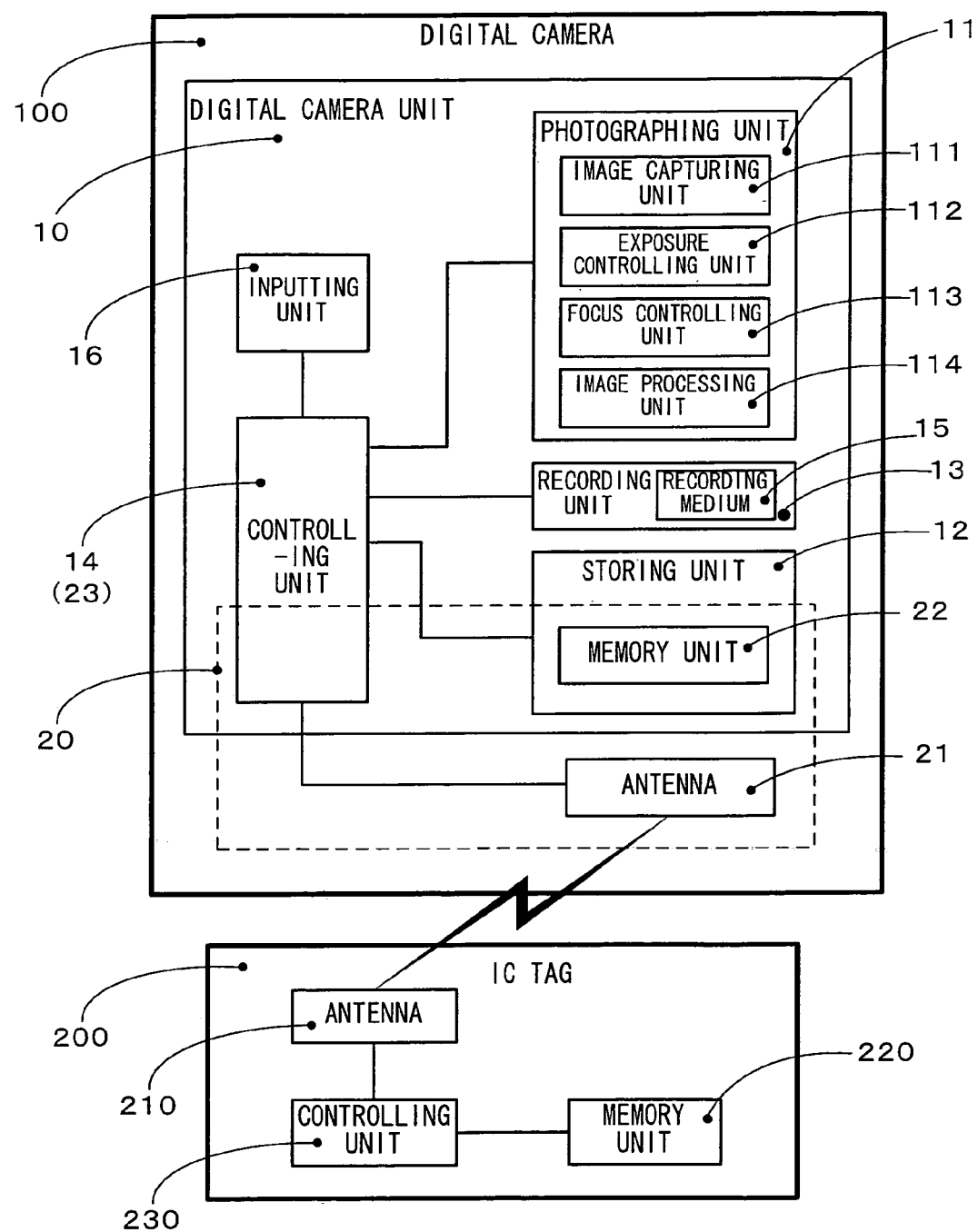
FIG. 5 is a diagram illustrating a block configuration in which the controlling units are integrated into a single controlling unit and the memory unit is made a part of the storing unit.

In addition, the controlling unit 14 of the digital camera unit 10 may double as the controlling unit 23 of the IC reader unit 20 and a part of the storing unit 12 of the digital camera unit 10 may be used as the memory unit 22 of the IC reader unit 20. FIG. 5 is a diagram illustrating a block configuration in which the controlling unit 14 and the controlling unit 23 are integrated to form a single controlling unit and the memory unit 22 is integrated to constitute a part of the storing unit 12. In FIG. 5, the IC reader 20 is indicated by a broken line.

SECOND EMBODIMENT

Figure 6:
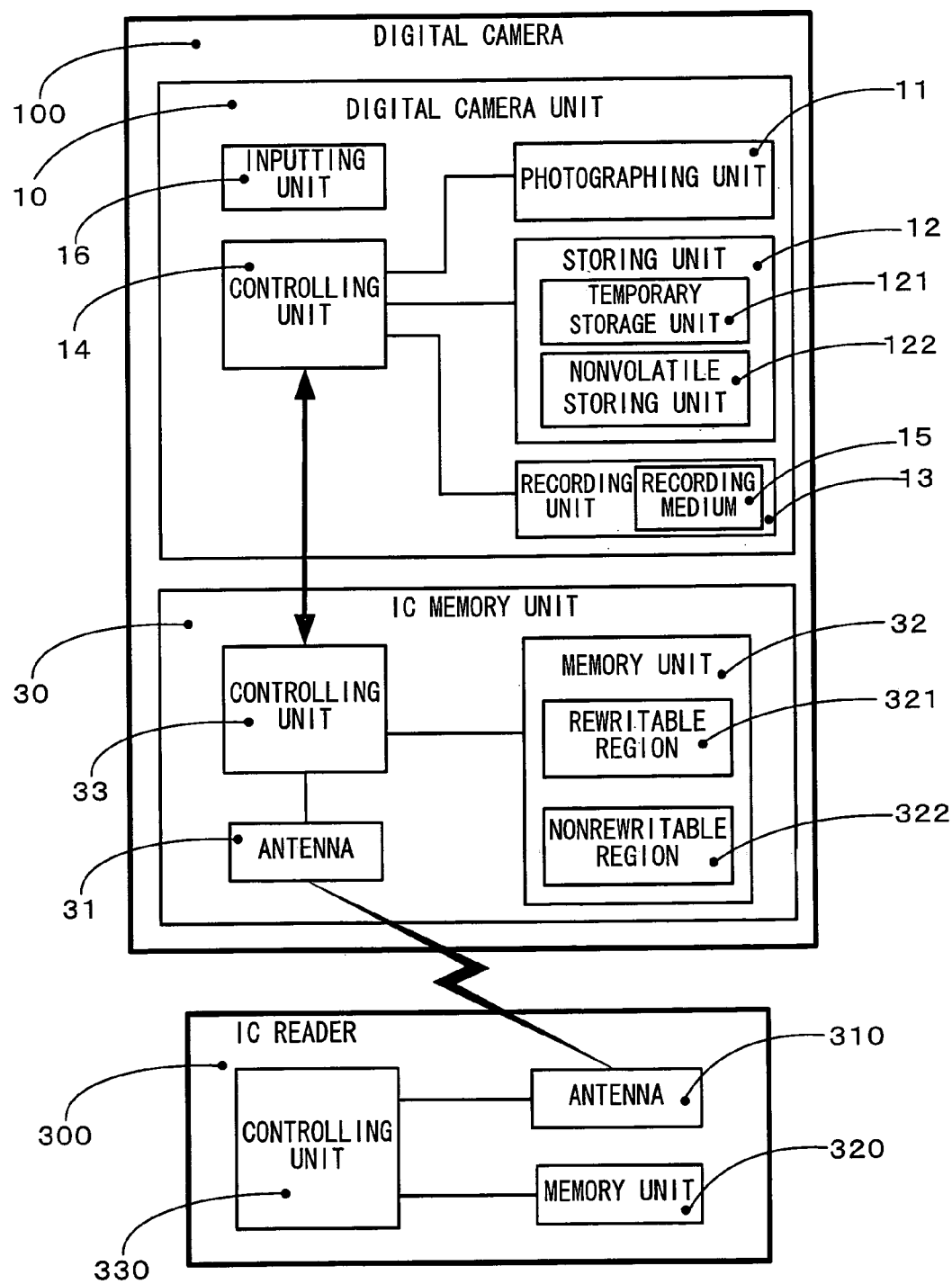
FIG. 6 is a block diagram presenting a configuration of the digital camera according to a second embodiment.

FIG. 6 is a block diagram presenting a configuration of the digital camera according to a second embodiment. The same components as those in the digital camera according to the first embodiment are designated by the same reference numerals. The digital camera 100 according to the second embodiment includes a digital camera unit 10 and an IC memory unit 30. The IC memory unit 30 includes an antenna unit 31, a memory unit 32, and a controlling unit 33. A part of the exterior components of the digital camera 100 includes a member made of a material that is transparent to radio waves, such as plastic. The antenna unit 31 in the IC reader unit 30 is arranged inside the member that is transparent to radio waves.

The IC memory 30 receives radio waves from the IC reader 30 to induce power in the antenna unit 31 due to electromagnetic induction and operates with the power, transmitting/receiving signals having a predetermined frequency (for example, 13.65 MHz) to/from an IC reader 300 to be detailed later. That is, the data transmitted from the IC reader 300 is received by the antenna unit 31 and recorded in the memory unit 32. Also the data recorded in the memory unit 32 is transmitted to the IC reader 300 through the antenna unit 31. It is to be noted that the IC memory unit 30 may have a battery therein to enable the above described operations to be performed with the power supplied from the battery.

The memory unit 32 of the IC memory unit 30 has a rewritable region 321 allowing rewriting a plurality of times and a nonrewritable region 322 not allowing rewriting at all. The nonrewritable region 322 is realized, for example, by adapting storage control by the controlling unit 33 such that an access for writing to a predetermined address in the memory unit 32 is permitted only once. Also the hardware structure of the nonrewritable region 322 may be achieved such that the access for writing is possible only once. Both the regions can be read freely.

The IC reader 300 includes an antenna unit 310, a memory unit 320, and a controlling unit 330. The IC reader 300 transmits/receives signals having the predetermined frequency to/from the IC memory unit 30 to thereby read the data stored in the memory unit 32 or writes predetermined data into the memory unit 32.

The controlling unit 33 of the IC memory unit 30 is connected to the controlling unit 14 of the digital camera unit 10 and can transmit/receive data to/from the controlling unit 14. It is to be noted that while the power of the digital camera unit 10 is ON, the digital camera unit 10 supplies power to the IC memory unit 30. As a result, the controlling unit 14 of the digital camera 10 can read/rewrite the data recorded in the memory unit 32 of the IC memory unit 30 through the controlling unit 33. That is, the data recorded in the IC memory unit 30 can be read and rewritten either by the IC reader 300 or the controlling unit 14 of the digital camera unit 10. The controlling unit 14 of the digital camera 10 and the memory unit 32 may be directly connected to each other to enable the controlling unit 14 to directly read/rewrite the data in the memory unit 32. The controlling unit 14 may also be configured such that when the capacity of the temporary storing unit 121 is deficient, the captured image is stored in the memory unit 32 temporarily or continuously.

Here, the respective units 31 to 33 of the IC memory unit 30 preferably are arranged on the same substrate as that on which the controlling unit 14 and the storing unit 12 are arranged. The arrangement of the units on the same substrate allows simultaneous fabrication of respective components of the IC memory unit 30 in the production process of the respective units of the digital camera unit 10, so that production cost can be decreased.

Sometimes, different consignees may require different operations to the digital camera 100. For instance, the contents of image processing performed in the inside of the digital camera are changed so that the type of language used in the menu screen displayed on a display unit (not shown) of a digital camera or images which are of choice by the consignees can be created. Such a change in operation can be achieved by changing the program executed by the controlling unit 14.

The program to be executed by the controlling unit 14 is installed in the digital camera 100 during the production process by the manufacturer of cameras. The program causes the digital camera 100 to perform the different operations as described above depending on the values of the parameters. For instance, a correspondence table that describes values of a parameter in correspondence to languages is prepared in advance and referring to this correspondence table, the language that corresponds to the designated value of parameter is used to perform displaying. Alternatively, a plurality of processing programs having different contents of processing may be installed in the digital camera 100 to enable selection of process program to be used based on the value of parameter. The processing program is, for example, a program for processing images.

The values of parameters are set to default values upon installing the program depending on the predetermined consignees. Upon installing the program, a most part of the program is stored in the memory unit 12 of the digital camera unit 10, whereas the values of parameters are stored in the memory unit 32 of the IC memory unit 30. The controlling unit 14 of the digital camera unit 10 reads the values of parameters from the memory unit 32 when the power of the digital camera 100 is turned ON and controls the operation of the digital camera 100 depending on the read values.

It is to be noted that the reading of the values of parameters from the memory unit 32 by the controlling unit 14 may be at the time when the digital camera 10 is set to a predetermined operation mode. This method is effective when the program is one for a specified operation mode, for example, an image-capturing mode of the digital camera unit 10.

Figure 8:
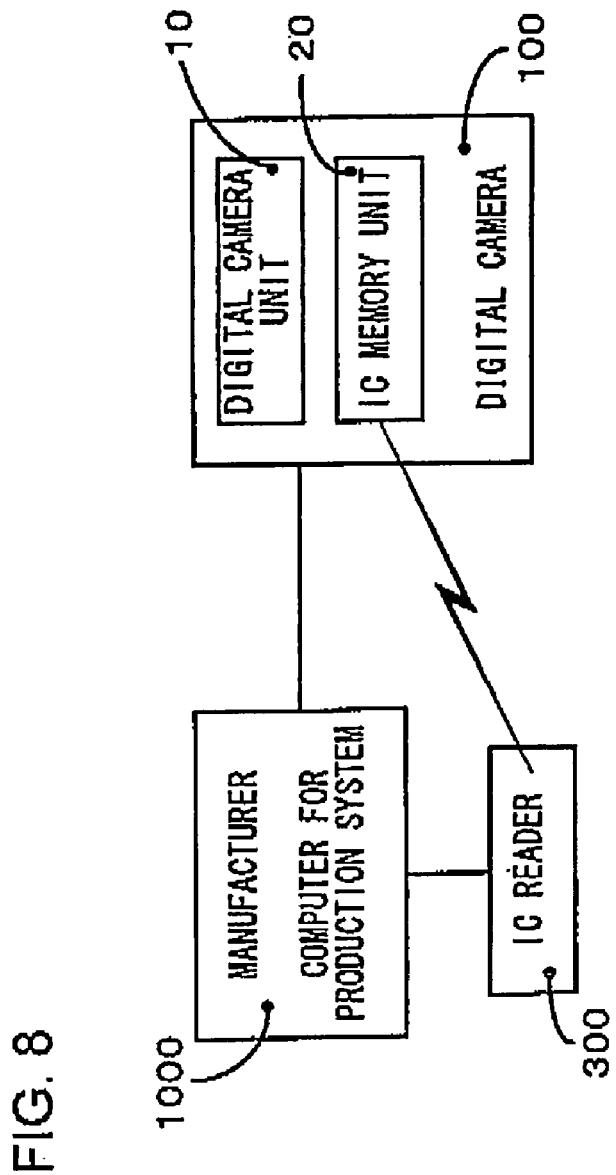
FIG. 8 is a diagram illustrating a production process of the digital camera.
Figure 9:
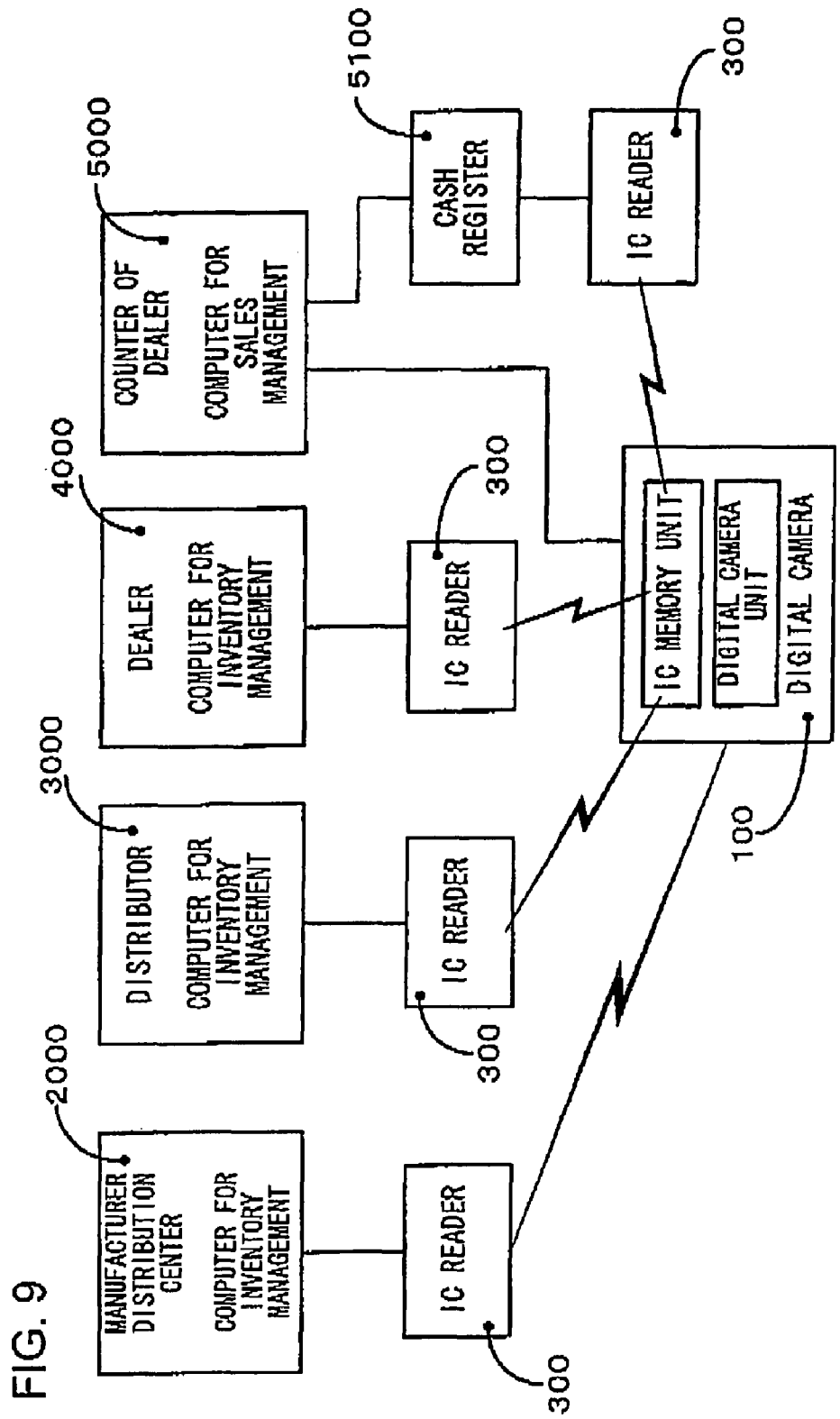
FIG. 9 is a diagram illustrating a distribution process of the digital camera.

Hereinafter, production and distribution processes of the digital camera 100 will be explained referring to FIGS. 8 and 9. First, referring to FIG. 8, the production process of the digital camera 100 is explained. The manufacturer who produces the digital camera 100 stores manufacturer information such as manufacturer, model, production factory, lot number, production date, firmware version number, product number, and shipping inspection date in the memory unit 32 of the IC memory unit 30 in the digital camera 100 by using the IC reader 300 provided in the computer 1000 for a digital camera production system. A part of manufacturer information may be stored as JAN (Japanese Article Number) code, which is a common merchandise code.

Upon storing the manufacturer information, a part of items, i.e., unique information specific to the digital camera, in particular a manufacturer number is stored in the nonrewritable region 322. The unique information is stored in the nonrewritable region 322 of the memory unit 32 in the IC memory unit 30 and hence cannot be either separated or rewritten like the production number engraved in the main body of the digital camera 100. That is, the unique information is completely in one-to-one correspondence to the digital camera.

When the computer 1000 for a production system directly connected to the digital camera 100 stores the program in the memory unit of the digital camera unit 10, the computer 1000 may also store the manufacturer information in the IC memory unit 32. The digital camera 100 is shipped from a distribution department of the manufacturer toward dealers and sold at the dealer shop. In mid-flow, the digital camera 100 passes through distribution center of the manufacturer, the distributor, and the dealer. At the respective distribution centers including the distribution center of the manufacturer, there is provided a computer for an inventory management which includes the IC reader 300 as an inputting device. The computers for an inventory management system at the distribution centers of the manufacturer, the distributor, and the dealer are designated by 2000, 3000, and 4000, respectively.

At the store front, a cash register 5100 including the IC reader 300 has an inputting/outputting device. The cash register 5100 is connected to a computer for a sales management system to constitute a so-called POS (point of sales) system. At each distribution center, the manufacturer information is read from the memory unit 32 of the IC memory 30 by the IC reader 300 and input into the computers 2000, 3000, and 4000 for the inventory management system when the digital cameras are stocked into or delivered from the warehouse. At the same time, distribution information such as date and hour of stock in or delivery from the warehouse and ship-to address are additionally written by the IC reader 300. As a result, the distribution history of the digital camera 100 is recorded in the memory unit 32 in the digital camera 100.

According to the method described above, the digital camera 100 can be processed still in a state where the digital camera 100 is packaged or unitary packed in order to read/write data from/into the memory unit 32 at each distribution center, so that the trouble can be greatly saved as compared with the conventional method in which the digital camera 100 is taken out and checked one by one.

When the digital camera 100 is sold to a user at the store front of a dealer, a sales person reads out the information in the memory unit 32 of the IC reader 300 connected to the cash register 5100. The read out information is input into the computer 5000 for a sales management system. The processing for managing sales of the digital camera is achieved based on the information input by the cash register 5100 and the computer 5000 for the sales management system. The IC reader 300 additionally writes sales information such as date and hour of sales and name of dealer shop to the memory unit 32, simultaneously with the reading of the information. In addition, the sales person inputs owner information relating to the owner of the digital camera 100, such as name, address and phone number of the purchaser, into the computer 5000 for the sales management system. The owner information on the digital camera is sent from the computer 5000 for the sales management system to the IC reader 300 and additionally written into the memory unit 32 of the IC memory unit 30.

It is to be noted that the system is configured such that the owner information can be changed by the owner himself by manipulation of the menu of the digital camera 100 but cannot be changed by a person other than the owner. For instance, a program is added to the program for controlling the digital camera 100 to permit changing of the owner information only after a predetermined password that is known to the owner only is input by manipulating the menu of the digital camera 100. The program performs verification by the predetermined password and rewriting of the owner information is prohibited if the verification has not been performed yet. In case the digital camera has been assigned to anyone else, rewriting of the owner information is performed. Since the manufacturer information, distribution history, sales information, and owner information are stored in the memory unit 32 of the IC memory unit 30 that cannot be separated from the digital camera unit 10, the digital camera 100 always keeps therein these types of information.

Figure 10:
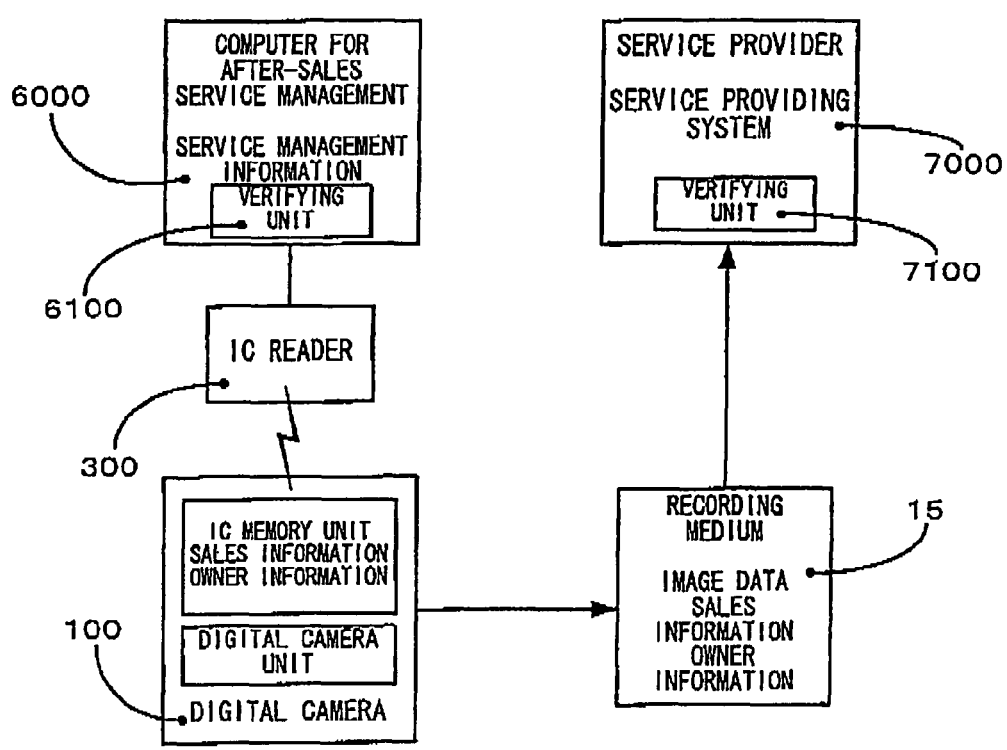
FIG. 10 is a diagram illustrating a flow of operations when a service such as repair is needed.

Referring to FIG. 10, a flow of the process when the digital camera 100 needs a service such as repair will be explained. When the digital camera 100 needs a service such as repair in a later date, the computer 6000 for service management in the dealer or the service department of the manufacturer reads out sales record, owner information, manufacturer information, and product number from the memory unit 32 by using the IC reader 300. Further, the distribution history is also read out from the memory unit 32 as necessary. The verifying unit 6100 in the computer 6000 for the service management verifies whether or not the digital camera 100 is within an unrequited period or not based on the date and hour of sales in the sales records. The computer 6000 for the service management issues a different service slip or a different rate bill based on the result of verification by the verifying unit 6100. In addition, the computer 6000 stores the service information on the digital camera 100 in a database for service management in the computer 6000 for the service management.

That is, the sales record and owner information stored in the memory unit 32 of the IC memory unit 30 serve as a conventional guarantee certificate. It is often the case that the guarantee certificate is lost or it takes a lot time to find out the guarantee certificate. Since the sales record and owner information are stored in the memory unit 32 incorporated into the digital camera 100, there occurs no problem such as loss of the guarantee certificate. It is to be noted that the change of values of parameters or version up of the program as described above can be achieved by using the IC reader 300 provided in the computer 6000 for service management.

Here, departing from the teaching of FIG. 10, a ship-to address of the digital camera 100 sometimes needs to be changed after the digital camera 100 is manufactured by manufacturer. On such an occasion, the manufacturer rewrites the values of parameters in the memory unit 32 to those corresponding to a new ship-to address by the IC reader 300 of the computer 2000 for the inventory management system at the distribution center. The rewriting of the values of parameters can be achieved on an appropriate computer provided with the IC reader 300 available from the manufacturer, for example, the computer 1000 for the production system. Here, explanation is made assuming that the rewriting of the values of parameters is performed by using the IC reader 300 in the computer 2000 for the inventory management system.

By rewriting the values of parameters, the digital camera 100 can be adapted to a new ship-to address. It is to be noted that the system may be configured such that the values of parameters cannot be rewritten by a person other than the personnel of the manufacturer. For instance, the controlling unit 23 may be configured to perform verification by using a predetermined password known to the manufacturer only and permit changing the values of parameters only after the digital camera has cleared such verification.

The parameters include a parameter that permits operation of the digital camera 100. The controlling unit 14 of the digital camera unit 10 detects that this parameter is at a specified value and enables the digital camera unit 10. The parameter is set to a value other than the specified value in a final stage of production by the manufacturer and the digital camera unit 10 is put into a disabled state. When the digital camera 100 is sold to a user and the IC reader 300 connected to the cash register 5100 additionally writes sales information to the memory unit 32, the value of the parameter is changed to the specified value. This brings the digital camera 100 into an enabled state. In this manner, the digital camera 100 other than that has been legally distributed can be prevented from being used.

Similarly to what is explained above on the situation where the values of parameters is changed, a program that operates the digital camera unit 10 may be transferred to the storing unit 12 of the digital camera unit 10 by storing the program in the memory unit of the IC reader 300 and writing the program into the memory unit 32 of the IC memory unit 30 in a non-contact state depending on a predetermined operation to the digital camera 100. This facilitates, for example, version up of the program stored in the digital camera 100.

A relatively small scale program that implements a part of functions of the digital camera 10 may be stored in the memory unit 32 of the IC memory unit 30. The controlling unit 33 of the IC memory 30 performs a predetermined process in response to a request by the controlling unit 14 of the digital camera unit 10 using a program and delivers the result of process to the digital camera unit 10. Information needed for performing the predetermined process such as data is obtained from the controlling unit 14 as necessary. The controlling unit 14 of the digital camera 10 uses the results of process by the IC memory unit 30 to control operation of the digital camera unit 100. Also, this program can be upgraded with ease by writing the program stored in the memory unit of the IC reader 300 into the memory unit 32 of the IC memory unit 30 in a non-contact state.

The program stored in the memory unit 32 may also be rewritten into a new program by the IC reader 300 in the computer 2000 for the inventory management system of the manufacturer as necessary. It is to be noted that the IC reader 300 has obtained in advance a new program, for example, from the computer 1000 for the production system of the manufacturer This is suitable for a program of which an upgraded version to improve the function thereof is likely to be released in a short period like a program for newly developed function.

The change of values of parameters or rewriting of the program is performed simultaneously with the reading/writing unique information and distribution information by the IC reader 300 of the inventory management server 2000 of the manufacturer. Also, the change of values of parameters or rewriting of the program may be performed simultaneously with the reading/writing the unique information, the distribution information, and the sales information performed by the distributor or dealer who is requested by and supplied with necessary data from the manufacturer by use of the IC reader 300 connected to the computer 3000 or 4000 for the inventory management system or the IC reader 300 connected to the cash register 5100.

Referring to FIG. 10 again, explanation is continued. The digital camera 100 reads the sales information from the memory unit 32 of the IC memory unit 30 when the recording medium 15 is mounted to the recording unit 13 and records the sales information in the recording medium 15. Further, the digital camera 100 reads distribution information from the memory unit 32 and records the distribution information in the recording medium 15. In addition, the digital camera 100 records data of a captured image for each image-procuring capturing in the recording medium 15. The user delivers the recording medium 15 to a service provider in order to receive a service using the image data. For instance, the recording medium 15 having recorded therein image data is taken out from the digital camera 100 and handed over to a print service to have the image data printed. The service provider provides predetermined service such as preparing a print of the image using the image data in the recording medium 15.

The service provider receives the recording medium 15 when receiving an application from the user and mounts the recording medium 15 on the computer 7000 for the service providing system. The computer 7000 for the service providing system reads the owner information contained in the sales information from the recording medium 15 and outputs by printing on an application blank for the service. This saves the trouble of writing down name, address, phone number and so on by the customer of the service.

The computer 7000 for the service providing system includes a verifying unit 7100. The verifying unit 7100 verifies whether or not the distribution information, sales information, and/or owner information is appropriate and if the result is appropriate, a predetermined service is provided, whereas if the result is inappropriate, a notice notifying to that effect is output. If the sales information or owner information is not described, there is a possibility that the digital camera 100 has not been legitimately sold. If the distribution information contains discontinuous data, the digital camera 100 is possibly a camera that is being distributed or that has been once exported to a foreign country and then reimported. In addition, if the unique information such as manufacturer number of the camera reported as stolen is registered in advance in the computer 7000 for the service providing system, the stolen camera may be found. Here, the information on robbery is understood to be included in the distribution information.

In most cases, the image data created by the digital camera is brought up to the service provider for receiving a service based on image data, so that the above described verification can be effectively performed at the time of reception of the application for the service by the service provider.

Figure 11:
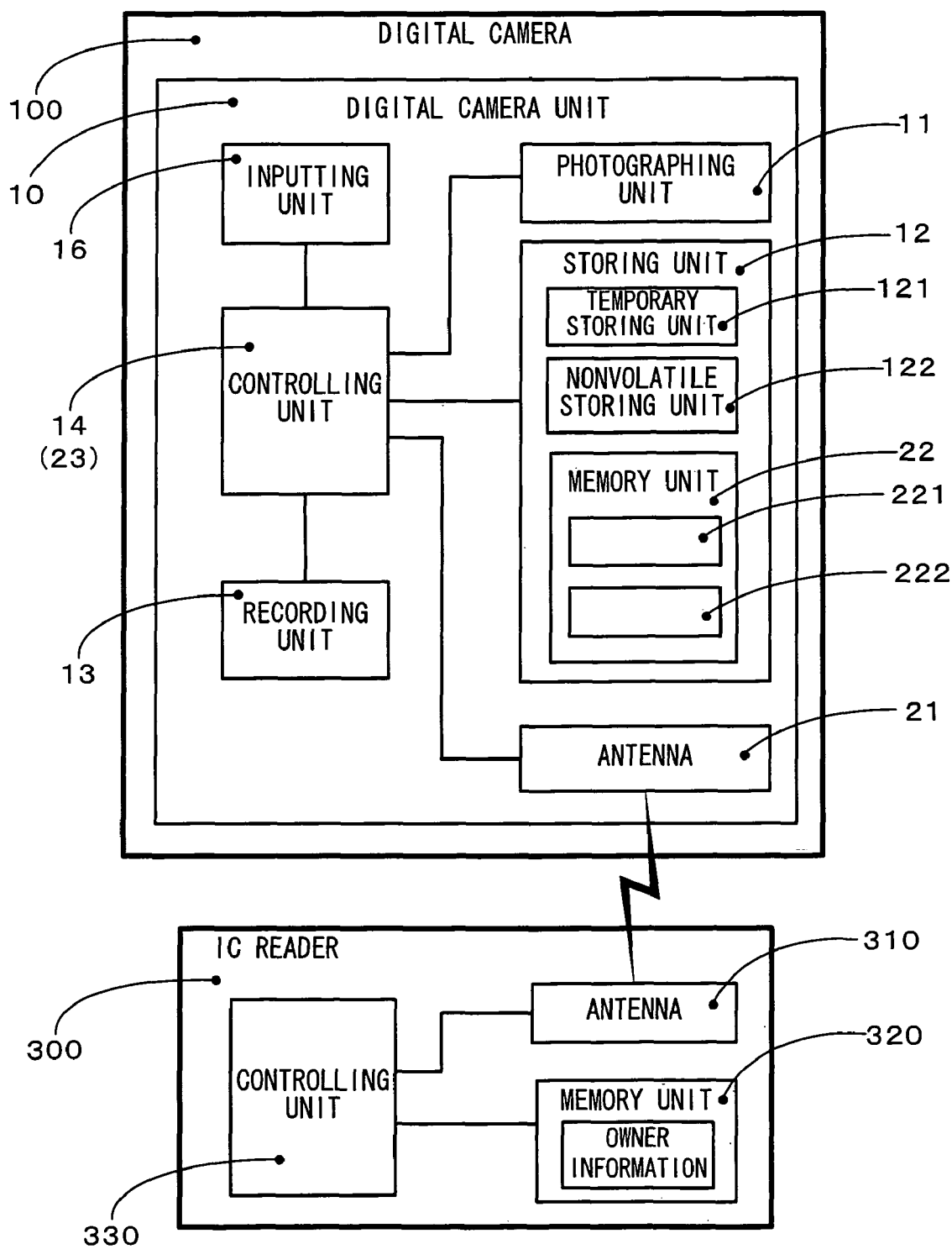
FIG. 11 is a diagram illustrating a block configuration in which the controlling units are integrated into a single controlling unit and the memory unit is made a part of the storing unit.

It is to be noted that the controlling unit 14 of the digital camera unit 10 may double as the controlling unit 33 of the IC reader unit 30 and a part of the storing unit 12 of the digital camera unit 10 may be used as the memory unit 22 of the IC reader unit 20. FIG. 11 is a diagram illustrating a block configuration in which the controlling unit 14 and the controlling unit 33 are integrated to form a single controlling unit and the memory unit 32 is integrated to constitute a part of the storing unit 12. This configuration enables production of a compact digital camera at a lower cost.

While various embodiments and variations have been explained above, the present invention is not limited thereto and other embodiments that are conceivable within the technical concepts of the present invention are included in the scope of the present invention.

The disclosure of the following base applications on which priority is claimed is incorporated herein by reference:

Japanese Patent Application No. 2005-97212 (filed Mar. 18, 2005);

Japanese Patent Application No. 2005-97213 (filed Mar. 18, 2005);

Japanese Patent Application No. 2005-97214 (filed Mar. 18, 2005); and

Japanese Patent Application No. 2005-361192 (filed Dec. 15, 2005).

The invention claimed is:

1. A digital camera comprising:
a photographing unit that takes an image of a subject;
a recording unit that records digital image data of the image taken by the photographing unit; and
a communication unit that wirelessly transmits/receives data to/from an external device capable of wirelessly transmitting/receiving data, wherein:
in response to image-capturing by the photographing unit, the communication unit procures, from the external device, information about the external device, and
the recording unit records the digital image data so as to be linked with the information about the external device procured by the communication unit.

2. The digital camera according to claim 1, wherein:
the communication unit procures the information about the external device from the external device upon the image-capturing.

3. The digital camera according to claim 1, wherein:
the communication unit procures the information about the external device from the external device after a predetermined length of time has elapsed from an image-capturing operation is instructed or after processing of the digital image data by the recording unit has been completed.

4. The digital camera according to claim 1, further comprising:
a memory unit that stores information about the external device procured by the communication unit, wherein
the memory unit updates a content of stored information each time when the communication unit procures the information about the external device.

5. The digital camera according to claim 1, wherein:
the communication unit transmits date and hour information of image-capturing to the external device in response to the image-capturing by the photographing unit.

6. The digital camera according to claim 1, wherein:
the communication unit, after an image-capturing operation of interest is performed and before a next image-capturing operation is executed, transmits the date and hour information relating to the image-capturing operation of interest to the external device.

7. The digital camera according to claim 1, further comprising:
a controlling unit that controls operation of the digital camera based on the information about the external device.

8. The digital camera according to claim 7, wherein:
the controlling unit changes exposure control or contents of image processing based on the information about the external device.

9. A digital camera comprising:
a digital camera unit including a photographing unit that takes an image of a subject; a recording unit that records digital image data of the image taken by the photographing unit; an inputting unit with which an instruction for photographing by the photographing unit is input; and a first controlling unit that controls each of the photographing unit, the recording unit, and the inputting unit; and
a contactless inputting/outputting unit including a first antenna unit that transmits/receives radio waves therethrough, a first storing unit that stores information, and a second controlling unit that controls memories in the first storing unit, the contactless inputting/outputting unit transmitting/receiving data to/from an external device, wherein:
the first controlling unit controls the units to receive data acquired by the second controlling unit from the external device.

10. The digital camera according to claim 9, wherein:
the contactless inputting/outputting unit induces power for operating the external device in the external device by radio waves transmitted from the first antenna unit and then transmits/receives data to/from the external device.

11. The digital camera according to claim 10, wherein:
the external device includes a second antenna unit that transmits/receives radio waves therethrough; a second storing unit that stores data; and a third controlling unit that controls memories in the second storing unit, and
the external device transmits/receives the data stored in the second storing unit to/from the contactless inputting/outputting unit using power induced in the second antenna unit when the second antenna unit receives radio waves therethrough from outside thereof.

12. The digital camera according to claim 9, wherein:
the external device includes a second antenna unit that transmits/receives radio waves therethrough; a second storing unit that stores data; and a third controlling unit that controls memories in the second storing unit, and
the external device transmits/receives the data stored in the second storing unit to/from the contactless inputting/outputting unit.

13. The digital camera according to claim 12, wherein:
the external device is fixed to an accessory of the digital camera.

14. The digital camera according to claim 9, wherein:
the contactless inputting/outputting unit receives data from the external device, and
the first controlling unit controls the units to receive the data that has been received from the external device through the contactless inputting/outputting unit and record the received data in the recording unit in relation to the image data.

15. The digital camera according to claim 9, wherein:
the contactless inputting/outputting unit receives data from the external device, and
the first controlling unit controls the unit to receive the data that has been received from the external device through the contactless inputting/outputting unit and changes control on each unit of the digital camera unit based on the received data.

16. The digital camera according to claim 15, wherein:
the first controlling unit changes exposure control.

17. The digital camera according to claim 15, wherein:
the first controlling unit changes contents of image processing.

18. The digital camera according to claim 14, wherein:
the first controlling unit issues an instruction to the second controlling unit to cause the second controlling unit to read-in data from the external device in response to an instruction for image-capturing to the inputting unit.

19. The digital camera according to claim 18, wherein:
inputting of an instruction for image-capturing to the inputting unit is performed by halfway pressing down a shutter release button.

20. The digital camera according to claim 18, wherein:
inputting of an instruction for image-capturing to the inputting unit is performed by fully pressing down a shutter release button.

21. The digital camera according to claim 9, wherein:
the first controlling unit issues an instruction to the second controlling unit to record data relating to a use history of the external device in the second storing unit of the external device in response to an instruction for image-capturing to the inputting unit.

22. The digital camera according to claim 21, wherein:
the first controlling unit issues an instruction to the second controlling unit to record data relating to a use history of the external device in the second storing unit of the external device after a predetermined length of time from inputting an instruction for image-capturing to the inputting unit.

23. The digital camera according to claim 21, wherein:
the first controlling unit issues an instruction to the second controlling unit to record data relating to a use history of the external device in the second storing unit of the external device after completion of image processing on an image taken by the photographing unit in response to an input of an instruction for image-capturing to the inputting unit.

* * * * *